US012797804B2

(12) United States Patent
Horiuchi et al.

(10) Patent No.: US 12,797,804 B2
(45) Date of Patent: Nov. 17, 2026

(54) GAS SEPARATION MEMBRANE AND METHOD OF PRODUCING GAS SEPARATION MEMBRANE

(71) Applicant: SEIKO EPSON CORPORATION, Tokyo (JP)

(72) Inventors: Yuta Horiuchi, Suwa (JP); Hiromu Miyazawa, Azumino (JP); Yasutaka Matsumoto, Suwa (JP); Oshi Iwakami, Chino (JP); Naoki Takatsu, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 356 days.

(21) Appl. No.: 18/487,440

(22) Filed: Oct. 16, 2023

(65) Prior Publication Data

US 2024/0131474 A1 Apr. 25, 2024
US 2024/0226812 A9 Jul. 11, 2024

(30) Foreign Application Priority Data

Oct. 20, 2022 (JP) ................................ 2022-168297

(51) Int. Cl.

*B01D 69/02* (2006.01)
*B01D 53/22* (2006.01)
*B01D 67/00* (2006.01)
*B01D 69/10* (2006.01)
*B01D 71/70* (2006.01)

(52) U.S. Cl.

CPC .......... *B01D 69/02* (2013.01); *B01D 53/228* (2013.01); *B01D 67/0002* (2013.01); *B01D 69/107* (2022.08); *B01D 71/701* (2022.08); *B01D 2257/504* (2013.01); *B01D 2325/04* (2013.01)

(58) Field of Classification Search

CPC .......... B01D 67/0002; B01D 67/00045; B01D 69/02; B01D 69/10; B01D 69/107; B01D 71/701; B01D 53/228; B01D 2257/504; B01D 2325/04

See application file for complete search history.

(56) References Cited

U.S. PATENT DOCUMENTS

2014/0208949 A1 7/2014 Ishizuka et al.
2019/0076777 A1* 3/2019 Mochizuki .......... B01D 53/228
2020/0238219 A1* 7/2020 Lee .................... B01D 53/228

(Continued)

FOREIGN PATENT DOCUMENTS

CN 103842060 A 6/2014
CN 110960993 A * 4/2020 ......... B01D 67/0002

(Continued)

OTHER PUBLICATIONS

Machine translation of JP-2015167875-A (Year: 2015).*

(Continued)

*Primary Examiner* — Robert Clemente
(74) *Attorney, Agent, or Firm* — CHIP LAW GROUP

(57) ABSTRACT

A gas separation membrane includes a first layer and a second layer that is provided at the surface on one side of the first layer and that includes a compound having gas separation ability. The average thickness of the second layer is smaller than an average thickness of the first layer. The second layer is an inkjet coating. The compound preferably includes a structure derived from PET, POM, PLA, PDMS, cellulose, or a coupling agent.

7 Claims, 8 Drawing Sheets

(56) References Cited

U.S. PATENT DOCUMENTS

| | | | | |
|---|---|---|---|---|
| 2022/0072483 | A1 | 3/2022 | Liu et al. | |
| 2024/0131478 | A1* | 4/2024 | Horiuchi | B01D 71/701 |

FOREIGN PATENT DOCUMENTS

| | | | | | |
|---|---|---|---|---|---|
| JP | S6075320 | A | | 4/1985 | |
| JP | 2011161387 | A | | 8/2011 | |
| JP | 2015167875 | A | * | 9/2015 | |
| JP | 2020203227 | A | * | 12/2020 | B01D 69/1213 |
| JP | 2022515165 | A | | 2/2022 | |
| WO | 2019044196 | A1 | | 3/2019 | |

OTHER PUBLICATIONS

Machine translation of CN-110960993-A (Year: 2020).*
Machine translation of JP-2020203227-A (Year: 2020).*
Office Action for JP Patent Application No. 2022168297, issued on Jun. 30, 2026, 9 pages.
Office Action for CN Patent Application No. 202311354633.8, issued on Jul. 29, 2026, 16 pages.

* cited by examiner

GAS SEPARATION MEMBRANE AND METHOD OF PRODUCING GAS SEPARATION MEMBRANE

The present application is based on, and claims priority from JP Application Serial Number 2022-168297, filed Oct. 20, 2022, the disclosure of which is hereby incorporated by reference herein in its entirety.

BACKGROUND

1. Technical Field

The present disclosure relates to a gas separation membrane and a method of producing a gas separation membrane.

2. Related Art

Techniques that capture and directly recover carbon dioxide from the atmosphere are being studied towards the goal of carbon neutral. Known techniques of this kind include chemical absorption methods in which carbon dioxide is absorbed by an absorption liquid or an adsorption material, as well as membrane separation methods in which carbon dioxide is separated using a gas separation membrane.

For example, JP-A-60-75320 discloses a gas-selective permeable membrane which selectively allows the passage of a specific gas. The gas-selective permeable membrane is produced by a process including stacking a thin film of a siloxane compound on a film-like polymeric porous support, subjecting the surface layer of the thin film to a plasma treatment using a non-polymerizable gas, and depositing a plasma-polymerized film on the thin film. JP-A-60-75320 also discloses that this process yields a gas-selective permeable membrane having strong adhesion between the thin film and the plasma-polymerized film, and that the thickness of the thin film is from 1 μm to 30 μm. Further, JP-A-60-75320 discloses that a gas such as oxygen, hydrogen, helium, or the like is selectively passed through the gas-selective permeable membrane, and the separated gas is recovered. It is believed that carbon dioxide can be separated by using such a gas-selective permeable membrane.

However, the gas-selective permeable membrane described in JP-A-60-75320 includes a composite membrane in which a plasma-polymerized film is deposited on a thin film. The thickness of a film formed using a plasma polymerization method varies depending on the film formation conditions, and thus it is not easy to result in a uniform film thickness. When the film thickness is small in some areas, pinholes may occur. As such, it is necessary to increase the target value of the film thickness during film formation. This leads to the problem of decreased gas permeability of the resulting gas-selective permeable membrane. Further, there is a limitation on materials that can be formed into a film using a plasma polymerization method. Therefore, despite having good selective separation property, a material may not be able to be formed into a film.

The situation above presents the challenge of realizing a gas separation membrane having excellent gas-selective separation property while having a small film thickness and excellent gas permeability.

SUMMARY

A gas separation membrane according to an application example of the present disclosure including:

- a first layer, and
- a second layer that is provided at the surface on one side of the first layer and that includes a compound having gas separation ability, wherein
- an average thickness of the second layer is smaller than an average thickness of the first layer, and
- the second layer is an inkjet coating.

A method of producing a gas separation membrane according to an application example of the present disclosure is a method of producing a gas separation membrane including

- a first layer, and
- a second layer that is provided at the surface on one side of the first layer and that includes a compound having gas separation ability,
- the method including a second layer forming step for forming the second layer having an average thickness smaller than that of the first layer by discharging an ink including the compound onto the surface on one side of the first layer using an inkjet method.

DESCRIPTION OF EMBODIMENTS

A gas separation membrane and a method of producing a gas separation membrane according to an aspect of the present disclosure will be described in detail below with reference to an embodiment illustrated in the accompanying drawings.

1. Overview of Gas Separation Membrane

First, a configuration of the gas separation membrane according to an embodiment will be described.

Figure 1:
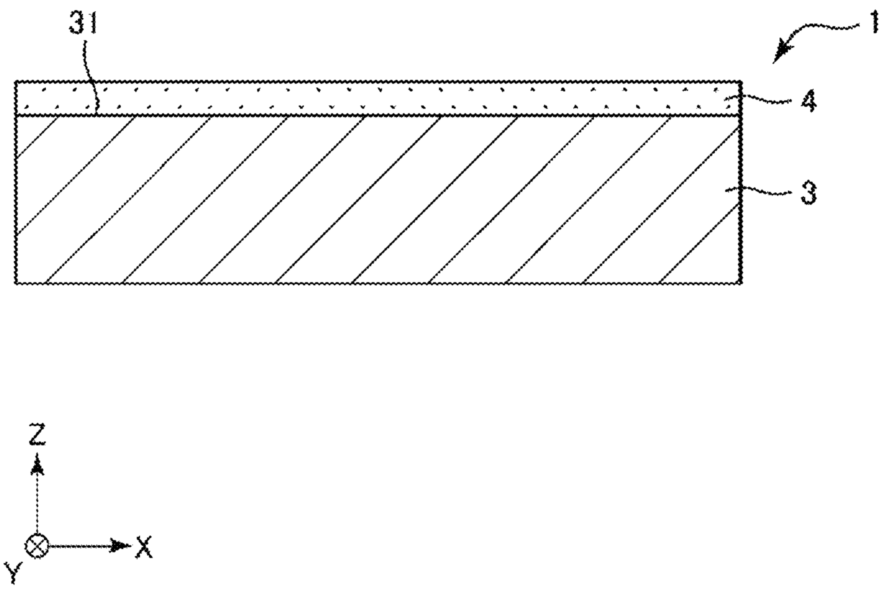
FIG. 1 is a cross-sectional view schematically illustrating a gas separation membrane according to an embodiment.

FIG. 1 is a cross-sectional view schematically illustrating a gas separation membrane 1 according to an embodiment. Note that, in each figure of the present application, an X-axis, a Y-axis, and a Z-axis are set as three mutually orthogonal axes, each indicated by an arrow. In the following description, the tip side of an arrow indicating each axis is referred to as the "plus side" of each axis, and the base end side of an arrow is referred to as the "minus side" of each axis. In addition, both directions along the X-axis are referred to as X-axis directions, and both directions along the Y-axis are referred to as Y-axis directions.

The gas separation membrane 1 illustrated in FIG. 1 has the function of selectively allowing the passage of a specific gas component and separating the specific gas component from a mixed gas including a plurality of gas components. The gas separation membrane 1 illustrated in FIG. 1 is a composite membrane having a first layer 3 and a second layer 4.

Examples of the specific gas component whose passage is selectively allowed by the gas separation membrane 1 include acidic gases such as carbon dioxide ($CO_2$), hydrogen sulfide ($H_2S$), sulfur oxides ($SO_x$), and nitrogen oxides ($NO_x$), as well as oxygen molecules, water molecules, and radioactive substances. Among them, the specific gas component is preferably an acidic gas, more preferably carbon dioxide or hydrogen sulfide, and even more preferably carbon dioxide. These gases can be separated by the gas separation membrane 1 at a particularly high selective separation ratio.

The second layer 4 has the ability to selectively allow the passage of the specific gas component described above (gas separation ability). Thus, the gas separation membrane 1 can selectively allow the passage of the specific gas component from upstream to downstream and separate the specific gas component. Note that, in the following description, the selective separation property targeting the specific gas component may be simply referred to as "selective separation property".

The average thickness of the second layer 4 is set to be smaller than the average thickness of the first layer 3. This allows the second layer 4 to have both good selective separation property and high gas permeability.

Note that, the mixed gas is supplied to the upper side of the gas separation membrane 1 illustrated in FIG. 1. Accordingly, the upper side of the gas separation membrane 1 illustrated in FIG. 1 is referred to as "upstream". In the gas separation membrane 1 illustrated in FIG. 1, the specific gas component passes through the gas separation membrane 1 from the upper side towards the lower side in FIG. 1. Accordingly, in the following description, the lower side of the gas separation membrane 1 illustrated in FIG. 1 is referred to as "downstream".

1.1. First Layer

The form of the first layer 3 is not limited. In addition to the sheet shape (flat-sheet shape) illustrated in FIG. 1, the first layer 3 may have a spiral shape, a tubular shape, a hollow-fiber shape, or the like.

Examples of the constituent material of the first layer 3 include a polymer material. Examples of the polymer material include: polyolefin resins, such as polyethylene and polypropylene; fluororesins, such as polytetrafluoroethylene, polyvinyl fluoride, and polyvinylidene fluoride; polystyrene; cellulose acetate; polyurethane; polyacrylonitrile; polyphenylene oxide; polysulfone; polyethersulfone; polyimide; polyaramid; and organopolysiloxanes.

Of these, the constituent material of the first layer 3 is preferably an organopolysiloxane. One molecule of the organopolysiloxane includes at least a unit represented by $R^1SiO_{3/2}$ (T unit), a unit represented by $R^2R^3SiO_{2/2}$ (D unit), and a unit represented by $R^4R^5R^6SiO_{1/2}$ (M unit) as basic constituent units. Note that in each unit, $R^1$ to $R^6$ each represents an aliphatic hydrocarbon or a hydrogen atom. One molecule of the organopolysiloxane includes a combination of the T unit, the D unit, and the M unit.

Specific examples of the organopolysiloxane include polydimethylsiloxane, polymethylphenylsiloxane, polydiphenylsiloxane, polysulfone/polyhydroxystyrene/polydimethylsiloxane copolymer, dimethylsiloxane/methylvinylsiloxane copolymer, dimethylsiloxane/diphenylsiloxane/methylvinylsiloxane copolymer, methyl-3,3,3-trifluoropropylsiloxane/methylvinylsiloxane copolymer, dimethylsiloxane/methylphenylsiloxane/methylvinylsiloxane copolymer, vinyl-terminated diphenylsiloxane/dimethylsiloxane copolymer, vinyl-terminated polydimethylsiloxane, H-terminated polydimethylsiloxane, and dimethylsiloxane-methylhydrosiloxane copolymer. It should be noted that these examples include the forms in which a cross-linking reaction product is formed. In addition, the constituent material of the first layer 3 may be a compound of one or more of these examples, or may be a composite material in which an organopolysiloxane, serving as the main component in terms of mass ratio, is used with another resin component.

Note that organopolysiloxanes have good gas permeability particularly to carbon dioxide. Therefore, it is useful as the constituent material of the first layer 3.

The average thickness of the first layer 3, although not limited, is preferably from 1 μm to 3000 μm, more preferably from 5 μm to 500 μm, and even more preferably from 10 μm to 150 μm. This gives the first layer 3 necessary and sufficient mechanical properties to serve as a base layer of the gas separation membrane 1 while suppressing a decrease in gas permeability.

Note that the average thickness of the first layer 3 can be obtained, for example, by magnifying and observing a cross section of the gas separation membrane 1 and calculating the average value of thicknesses measured at ten locations of the first layer 3.

The gas permeability of the first layer 3 may be set higher than the gas permeability of the second layer 4. Specifically, when carbon dioxide is the target gas component, the gas permeation rate of the first layer 3 may be higher than the gas permeation rate of the second layer 4. This allows the first layer 3 to impart good gas permeability to the gas separation membrane 1 while mechanically supporting the second layer 4.

Note that, the expression "high gas permeability" means that the permeation rate of carbon dioxide is high. To be more specific, when carbon dioxide is supplied with the total upstream pressure set to 4 MPa, the permeation rate of carbon dioxide at the second layer 4 may be high.

The permeation rate of carbon dioxide at the first layer 3 is preferably $1\times10^{-5}$ $cm^3$ (STP)/$cm^2$·sec·cmHg (10 GPU) or greater, more preferably $3\times10^{-5}$ $cm^3$ (STP)/$cm^2$·sec·cmHg (30 GPU) or greater, even more preferably 100 GPU or greater, and still more preferably 200 GPU or greater, when carbon dioxide is supplied at a total upstream pressure of 4 MPa and at a temperature of 40° C.

The first layer 3 can be produced by a method of producing a sheet or a film. The first layer 3 can also be produced by a method of forming a film on a sacrificial layer and then removing the sacrificial layer.

1.2. Second Layer

The second layer 4 is formed at an upper surface 31 (the surface on one side) of the first layer 3. The second layer 4 is composed of an inkjet coating. The inkjet coating may be composed of a plurality of first fixed films 41 of ink droplets arranged on the upper surface 31 of the first layer 3, the ink droplets including the constituent material of the second layer 4. That is, the second layer 4 is an aggregate of the first fixed films 41 formed of ink droplets that have set. In such a second layer 4, film breakage is less likely to occur even when the film thickness is made sufficiently small. Therefore, the resulting second layer 4 has a high coverage rate with respect to the upper surface 31 even when having a sufficiently small average thickness. The second layer 4 has the above-described gas separation ability, and thus the gas separation membrane 1 according to the present embodiment has high selective separation property and high gas permeability.

The average thickness of the second layer 4, although not limited, is preferably from 1 nm to 100 nm, more preferably from 5 nm to 90 nm, and even more preferably from 30 nm to 80 nm. This makes it possible to increase the gas permeability while ensuring the selective separation property of the second layer 4. Note that, when the average thickness of the second layer 4 is less than the lower limit value described above, the selective separation property may decrease depending on the constituent material of the second layer 4. Meanwhile, when the average thickness of the second layer 4 exceeds the upper limit value described above, the gas permeability of the second layer 4 may decrease depending on the constituent material of the second layer 4.

Note that the average thickness of the second resin layer 4 can be obtained, for example, by magnifying and observing a cross section of the gas separation membrane 1 and calculating the average value of the thicknesses at ten locations of the second resin layer 4.

Figure 2:
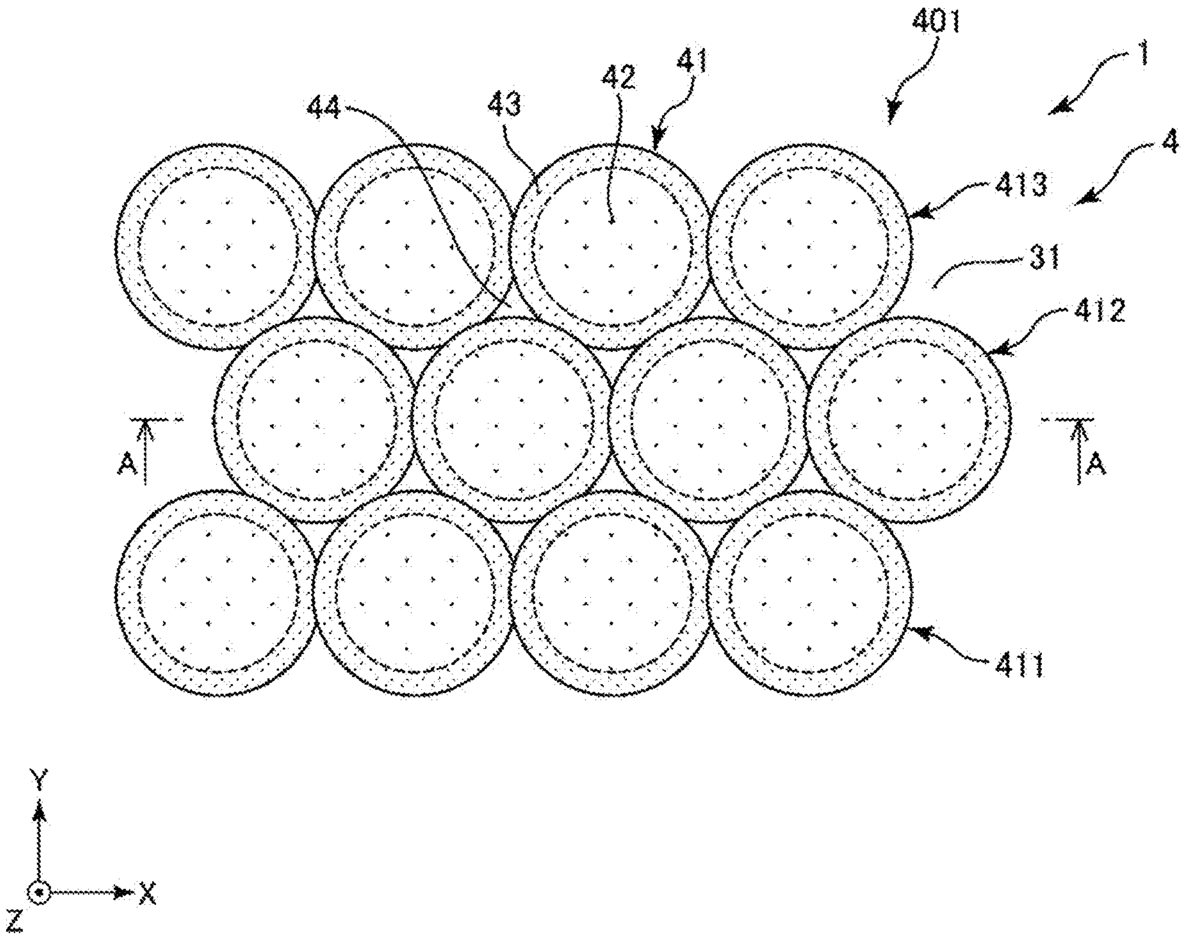
FIG. 2 is a plan view of the second layer illustrated in FIG. 1 as viewed from upstream.
Figure 3:
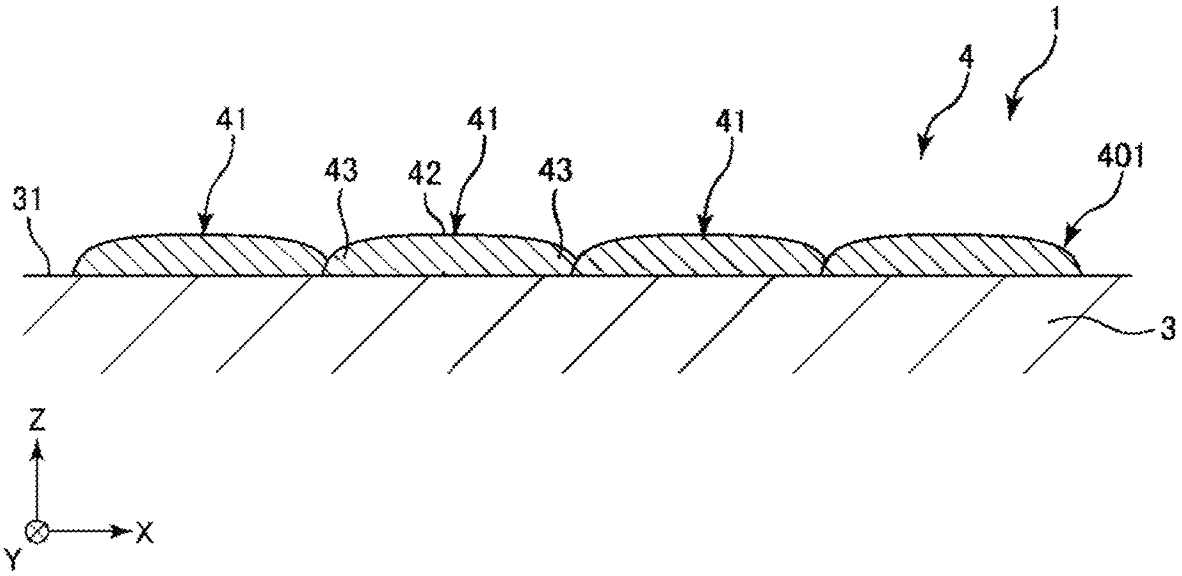
FIG. 3 is a cross-sectional view taken along the line A-A in FIG. 2.

FIG. 2 is a plan view of the second layer 4 illustrated in FIG. 1 as viewed from upstream. FIG. 3 is a cross-sectional view taken along the line A-A in FIG. 2.

The second layer 4 is formed by an inkjet method, and thus the first fixed films 41 of the ink droplets can be disposed substantially accurately at the target positions. The first fixed films 41 of the ink droplets are formed by ink droplets discharged using an inkjet method that have landed and hardened, the ink droplets including the constituent material of the second layer 4. The second layer 4 illustrated in FIG. 2 is an example in which the discharge positions of the ink droplets are set in such a manner that the first fixed films 41 adjacent to each other in the X-axis directions and the Y-axis directions are in contact with each other. With this arrangement, overlaps between the first fixed films 41 can be minimized. Accordingly, the film thickness of an inkjet coating 401 composed of the plurality of first fixed films 41 can be made smaller.

The shape of one first fixed film 41 in plan view is often a circular shape as illustrated in FIG. 2, but it may be another shape. As illustrated in FIG. 3, the first fixed film 41 has a relatively thick central portion 42 and a circumferential portion 43 thinner than the central portion 42. In the first fixed films 41 having such a shape, the film thicknesses of the circumferential portions 43, which are more likely to overlap with each other, are kept smaller than the thicknesses of the central portions 42; this helps to suppress the occurrence of an extremely thick portion even when the circumferential portions 43 overlap. As such, the resulting gas separation membrane 1 is less likely to have defects. In addition, the first fixed film 41 includes portions having different film thicknesses; this helps to increase the specific surface area of the second layer 4. The specific surface area of the second layer 4 affects the contact area between the second layer 4 and the pre-separation mixed gas. As the specific surface area of the second layer 4 increases, the opportunity of contact between the constituent material of the second layer 4 and the mixed gas increases. As such, the selective separation property can be improved even when the gas separation membrane 1 is thin. Note that, the film thickness of the central portion 42 of the first fixed film 41 illustrated in FIG. 3 refers to the film thickness at the maximum position of the curve drawn by the upper surface of the cross section of the first fixed film 41. When the cross section of the first fixed film 41 has the shape illustrated in FIG. 3, the thickness of the second layer 4 described above is the film thickness of the central portion 42.

The film thickness of the circumferential portion 43 is the film thickness at a position on the diameter of the first fixed film 41 10% inward from the contour of the first fixed film 41 when the first fixed film 41 is viewed in a plan view. Note that, the diameter of the first fixed film 41 is the diameter of a circle inscribed in the contour of the first fixed film 41 (inscribed circle) when the first fixed film 41 is viewed in a plan view.

In this case, the film thickness of the central portion 42 may be greater than the film thickness of the circumferential portion 43. The film thickness of the central portion 42 is preferably from 105% to 1000%, more preferably from 120% to 800% of the film thickness of the circumferential portion 43. When the difference in film thicknesses is within the above range, the selective separation property of the second layer 4 can be sufficiently increased while defects caused by an excessively large difference in film thicknesses can be avoided. Note that, when the film thickness of the central portion 42 is less than the lower limit value described above, the difference in film thicknesses between the central portion 42 and the circumferential portion 43 is too small, which may make it impossible to ensure a sufficiently large specific surface area of the second layer 4. Meanwhile, when the film thickness of the central portion 42 exceeds the upper limit value described above, the film thickness of the central portion 42 may become too thick depending on the film thickness of the circumferential portion 43.

In FIG. 2, as an example for increasing the coverage rate of the upper surface 31 by the first fixed films 41, the first fixed films 41 are arranged along the X-axis directions, forming a first row 411, a second row 412, and a third row 413. In the second row 412 located between the first row 411 and the third row 413, the first fixed films 41 are disposed at positions corresponding to the middle between the first fixed films 41 constituting the first row 411 and the middle between the first fixed films 41 constituting the third row 413. That is, the positions of the first fixed films 41 constituting the second row 412 are shifted, with respect to the first row 411 and the third row 413, to an X-axis direction by a length corresponding to the radius of the first fixed films 41.

By arranging the first fixed films 41 in the pattern described above, the coverage rate can be increased without increasing the number of the first fixed films 41 constituting the second layer 4.

Figure 4:
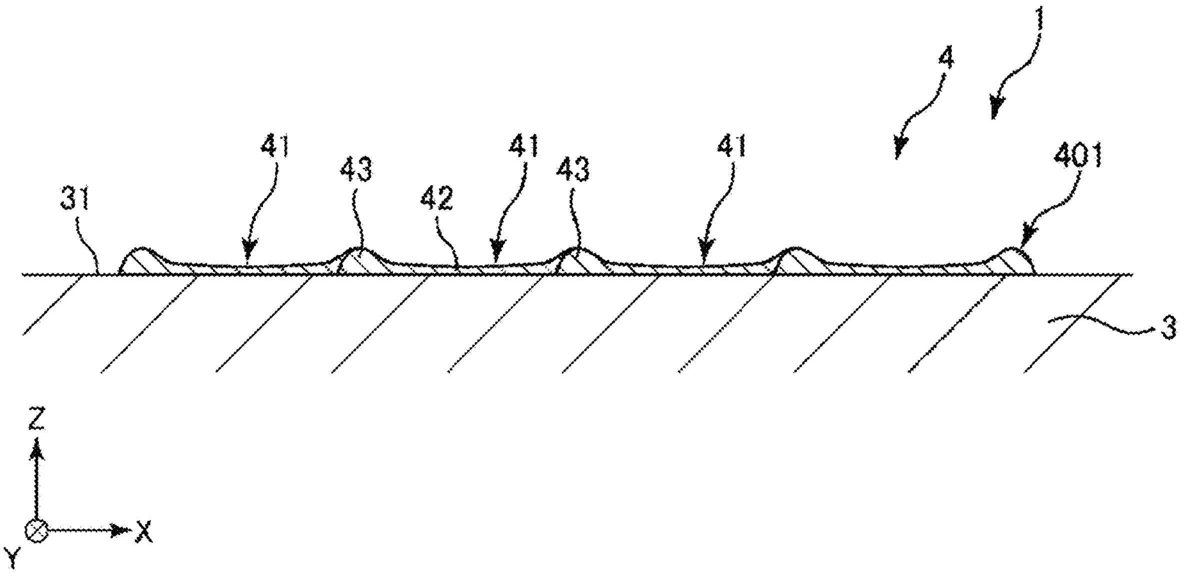
FIG. 4 is a variation of the second layer illustrated in FIG. 3.

FIG. 4 is a variation of the second layer 4 illustrated in FIG. 3.

Contrary to FIG. 3, the first fixed film 41 illustrated in FIG. 4 has a relatively thin central portion 42 and a circumferential portion 43 thicker than the central portion 42. In the first fixed film 41 having such a shape, a relatively wide area can be ensured for the central portion 42 having a small film thickness, and the specific surface area of the first fixed film 41 can be increased by the circumferential portion 43 having a large film thickness. As such, the resulting gas separation membrane 1 has high selective separation property even when having a small thickness. Note that, the film thickness of the central portion 42 of the first fixed film 41 illustrated in FIG. 4 refers to the film thickness at the minimum position of the curve drawn by the upper surface of the cross section of the first fixed film 41. In addition, the film thickness of the circumferential portion 43 refers to the film thickness at the maximum position of the curve drawn by the upper surface of the cross section of the first fixed film 41. Further, when the cross section of the first fixed film 41 has the shape illustrated in FIG. 4, the thickness of the second layer 4 described above is the film thickness of the circumferential portion 43.

In this case, the film thickness of the central portion 42 may be smaller than the film thickness of the circumferential portion 43. The film thickness of the central portion 42 is preferably from 5% to 99%, more preferably from 10% to 80% of the film thickness of the circumferential portion 43. When the difference in film thicknesses is within the above range, the selective separation property of the second layer 4 can be sufficiently increased while defects caused by an excessively large difference in film thicknesses can be avoided. Note that, when the film thickness of the central portion 42 is less than the lower limit value described above, the difference in film thicknesses between the central portion 42 and the circumferential portion 43 is too large. As a result, residual stress, pinholes, or the like may occur easily. Meanwhile, when the film thickness of the central portion 42 is above the upper limit value described above, the difference in film thicknesses is too small, leading to the possibility that the specific surface area of the second layer 4 cannot be made sufficiently large.

Note that, whether the cross-sectional shape of the first fixed film 41 is the shape illustrated in FIG. 3 or the shape illustrated in FIG. 4 can be controlled by the composition of the ink droplet. For example, when the solid content concentration in the ink droplet is high, the cross-sectional shape of the first fixed film 41 is likely the shape illustrated in FIG. 3, and when the solid content concentration is low, the cross-sectional shape of the first fixed film 41 is likely the shape illustrated in FIG. 4.

When the first fixed films 41 are disposed in the pattern illustrated in FIG. 2, a gap 44 may be formed at a position surrounded by three first fixed films 41. In the second layer 4 in which the gap 44 is formed, components other than the target gas component also pass easily. As a result, the passage of the target gas component cannot be selectively allowed, and the selective separation property of the second layer 4 may decrease. Therefore, the second layer 4 may have a two-layer structure in which the inkjet coating 401 illustrated in FIG. 3 or FIG. 4 is overlapped by another inkjet coating.

Figure 5:
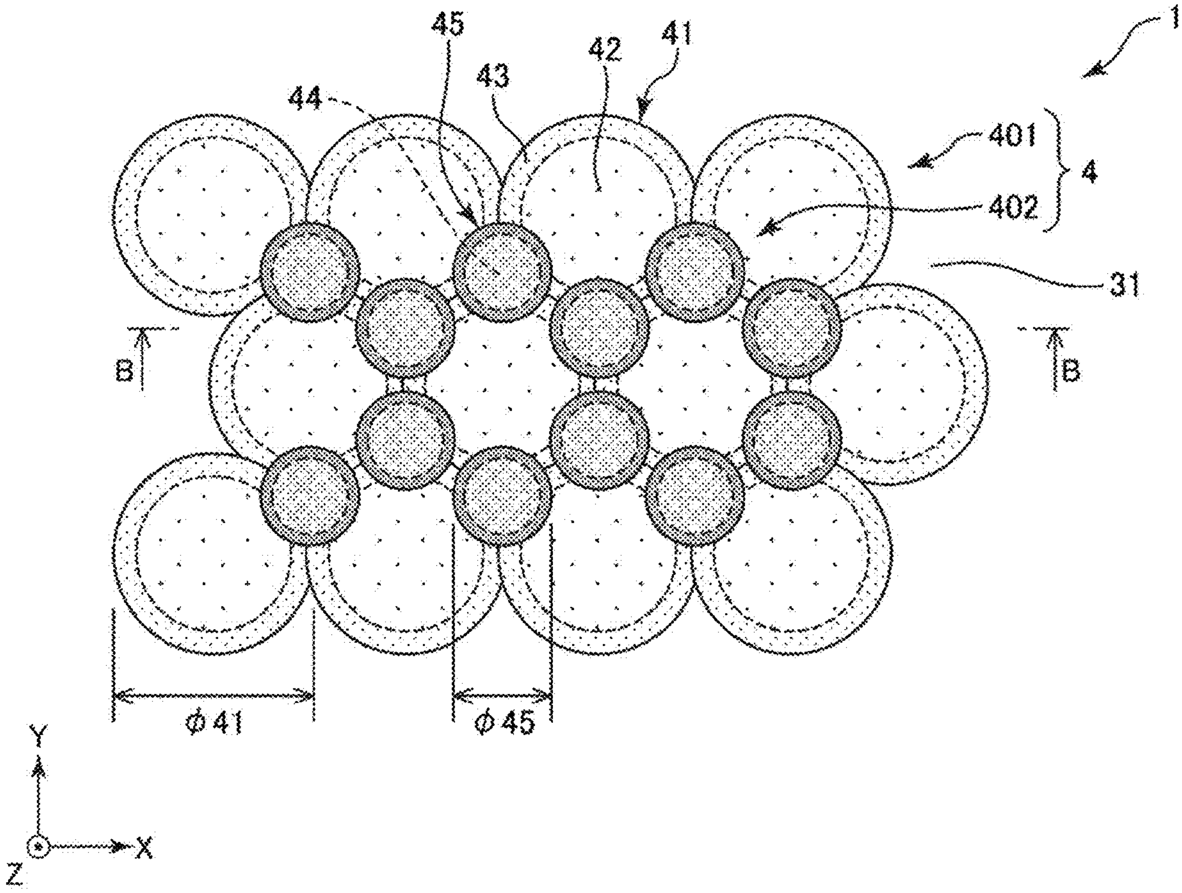
FIG. 5 is a plan view, as viewed from upstream, of a second layer having a two-layer structure in which the inkjet coating located at the first layer illustrated in FIG. 2 is overlapped by another inkjet coating.
Figure 6:
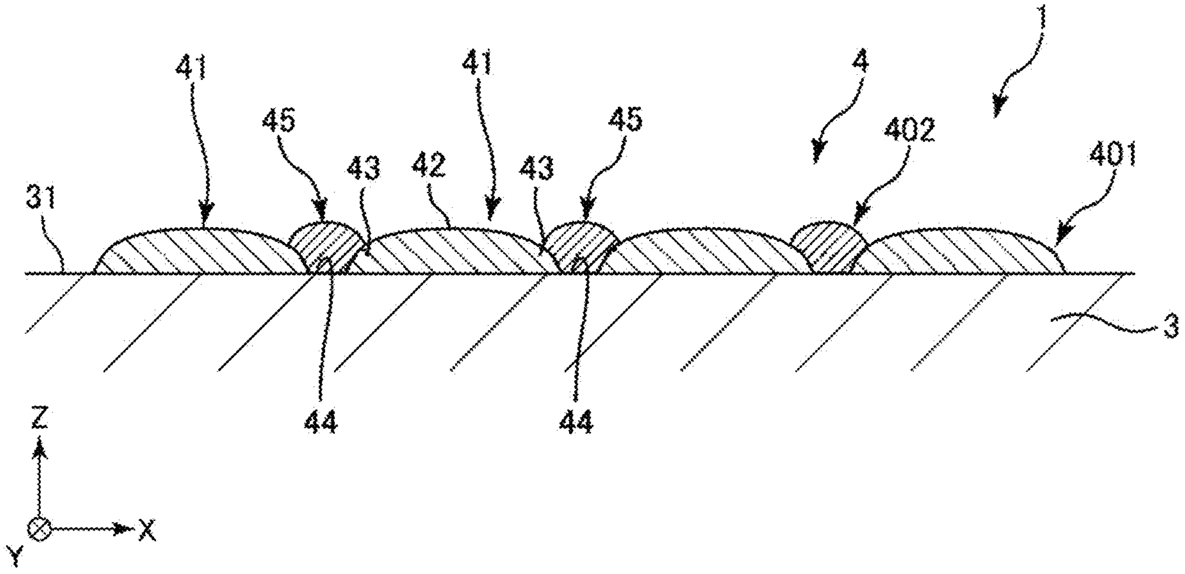
FIG. 6 is a cross-sectional view taken along the line B-B in FIG. 5.

FIG. 5 is a plan view, as viewed from upstream, of a second layer 4 having a two-layer structure in which the inkjet coating 401 located at the first layer illustrated in FIG. 2 is overlapped by another inkjet coating 402. FIG. 6 is a cross-sectional view taken along the line B-B in FIG. 5.

In the pattern illustrated in FIG. 5, a second fixed film 45 is disposed at a position overlapping the gap 44 of the inkjet coating 401 located at the first layer. Thus, the gap 44 can be filled with the second fixed film 45. Further, a plurality of second fixed films 45 form the inkjet coating 402 located at the second layer. As a result, the decreased selective separation property of the gas separation membrane 1 due to the gaps 44 can be solved or mitigated by the inkjet coating 402. Therefore, the second layer 4 may have a multilayer structure as illustrated in FIG. 5. The term "multilayer structure" refers to a structure having two or more stacked layers of inkjet coating.

In addition, in the case of a multilayer structure, even when a pinhole is formed in the first layer 3 or the second layer 4, the pinhole can be filled by selectively supplying an ink droplet to the site. Therefore, the gas separation membrane 1 which would have been a defective product in the past can easily be utilized effectively.

The average diameter φ41 of the first fixed films 41 is not limited, but is preferably from 0.5 μm to 500 μm, more preferably from 1 μm to 300 μm, and even more preferably from 3 μm to 100 μm. This can make the gaps 44 smaller. As a result, the probability that the gaps 44 are filled with the second fixed film 45 can be increased, and the selective separation property of the second layer 4 can be increased.

The average diameter φ45 of the second fixed films 45 is not limited, and may be greater than the average diameter φ41 of the first fixed film 41, but is preferably less than the average diameter φ41. This can keep the area where the first fixed films 41 and the second fixed films 45 overlap (overlapping area) small. As a result, the average thickness of the second layer 4 can be made sufficiently small, making it possible to suppress a decrease in gas permeability.

The average diameter φ45 is preferably 95% or less, more preferably from 10% to 90%, and even more preferably from 20% to 80% of the average diameter φ41. This can keep the overlapping area particularly small while sufficiently filling the gaps 44. This can also prevent the second layer 4 from becoming thicker than necessary.

The coverage rate of the second layer 4 with respect to the first layer 3 is preferably 95.0% or greater, and more preferably 99.0% or greater. With this configuration, even if a pinhole is present in the first layer 3, the probability of the pinhole being filled by the second layer 4 is increased, and the ratio of passage of components other than the target gas component can be suppressed. As a result, the selective separation property (separation ratio of a specific gas component) of the second layer 4 can be sufficiently increased.

Note that, the coverage rate of the second layer 4 with respect to the first layer 3 is obtained as follows. An image of a range containing 100 or more first fixed films 41 is captured from upstream of the gas separation membrane 1; then, the coverage rate of the second layer 4 with respect to the first layer 3 is obtained as a ratio of the area of the second layer 4 to the area of the captured image. The area of the image depends on the size of the first fixed film 41, but is preferably set to 10 $mm^2$ or greater.

The second layer 4 is composed of a compound having gas separation ability. The compound having gas separation ability is not limited, but preferably includes polyethylene terephthalate (PET), polyacetal (POM), polylactic acid (PLA), polydimethylsiloxane (PDMS), or cellulose. These compounds facilitate the realization of the second layer 4 having affinity particularly for acidic gases and good selective separation property.

Among them, polydimethylsiloxane may be a polydimethylsiloxane derivative. Examples of the polydimethylsiloxane derivative include derivatives obtained by substituting one or more, preferably one, of the hydrogen atoms of methyl groups contained in polydimethylsiloxane with a polar group. Examples of the polar group include the functional groups described below, and the polar group is preferably a hydroxyl group or an amino group. All of the methyl groups contained in polydimethylsiloxane may be substituted as described above, but preferably, only some of the methyl groups are substituted. This imparts the second layer 4 with good affinity for carbon dioxide. As a result, the gas separation membrane 1 can further have both gas-selective separation property and gas permeability.

Further, the compound may include a structure derived from a coupling agent. The coupling agent has a hydrolyzable group and a functional group, and exhibits bondability to the upper surface 31 by hydrolysis of the hydrolyzable group. In addition, the hydrolyzed hydrolyzable group and the hydroxyl group of the upper surface 31 may undergo dehydration condensation and turn into a covalent bond. Meanwhile, selection of the functional group leads to the realization of the second layer 4 exhibiting affinity for a specific gas component and having good selective separation property. Therefore, examples of the structure derived from the coupling agent include a hydrolyzate of the coupling agent and a product of dehydration condensation between such a hydrolyzate and a hydroxyl group.

The functional group is selected as appropriate depending on the gas component targeted to be separated. Specifically, an atomic group having affinity for the gas component targeted to be separated is selected. For example, when the gas component targeted to be separated is an acidic gas, the atomic group selected is preferably a polar group. Examples of the polar group include a hydroxyl group, a carboxylic acid group, a carboxylate group, an acid anhydride group, an amino group, an amide group, an epoxy group, a mercapto group, and a phenyl group. Among them, the functional group is particularly preferably an amino group, a carboxylic acid group, or a phenyl group. These groups have particularly good affinity for the n electrons of carbon dioxide. Therefore, the second layer 4 having these groups is imparted with good selective separation property with respect to carbon dioxide.

1.3. Other Configurations

In addition to the above description of the gas separation membrane 1 according to an embodiment, an optional layer may be provided at either downstream of the first layer 3 or between the first layer 3 and the second layer 4 or both. For example, a porous layer composed of a porous substance may be provided downstream of the first layer 3. The porous layer may have a higher gas permeability as well as a higher rigidity compared to the first layer 3. This can further increase the rigidity of the gas separation membrane 1, which contributes to the improvement of the shape retention and durability of the gas separation membrane 1.

Examples of the constituent material of the porous layer include a polymer material, a ceramic material, and a metal material. The constituent material of the porous layer may also be a composite material of any of the aforementioned materials and another material.

Examples of the polymer material include: polyolefin resins, such as polyethylene and polypropylene; fluororesins, such as polytetrafluoroethylene, polyvinyl fluoride, and polyvinylidene fluoride; polystyrene; cellulose acetate; polyurethane; polyacrylonitrile; polyphenylene oxide; polysulfone; polyethersulfone; polyimide; and polyaramid.

Examples of the ceramic material include alumina, cordierite, mullite, silicon carbide, and zirconia. Examples of the metal material include stainless steel.

The average thickness of the porous layer, although not limited, is preferably from 1 μm to 3000 μm, more preferably from 5 μm to 500 μm, and even more preferably from 10 μm to 150 μm. This gives the porous layer necessary and sufficient rigidity to support the first layer 3 and the second layer 4.

Note that the average thickness of the porous layer is an average value of thicknesses in the stacking direction measured at ten locations of the porous layer. The thickness measurement of the porous layer can be carried out by using, for example, a thickness gauge.

The average pore diameter of the porous layer is preferably 0.1 μm or less, more preferably from 0.01 μm to 0.09 μm, and even more preferably from 0.01 μm to 0.07 μm. In this way, the first layer 3 is less likely to run over downstream of the porous layer.

The average pore diameter of the porous layer is measured by a through-pore diameter evaluation device. Examples of the through-pore diameter evaluation device include Perm-Porometer available from Porous Materials Inc.

The porosity of the porous layer is preferably from 20% to 90%, more preferably from 30% to 80%. This allows the porous layer to have both good gas permeability and sufficient rigidity. The porosity of the porous layer is measured by the above-described through-pore diameter evaluation device.

Note that, in the gas separation membrane 1 described above, the selective separation ratio of carbon dioxide to nitrogen is preferably 10 or greater, more preferably 15 or greater. This results in the gas separation membrane 1 suitable for separating carbon dioxide from the atmosphere. Note that, the selective separation ratio of carbon dioxide to nitrogen is determined as the ratio of the permeation rate of carbon dioxide to the permeation rate of nitrogen.

2. Method of Producing Gas Separation Membrane

Next, a method of producing a gas separation membrane according to an embodiment will be described.

Figure 7:
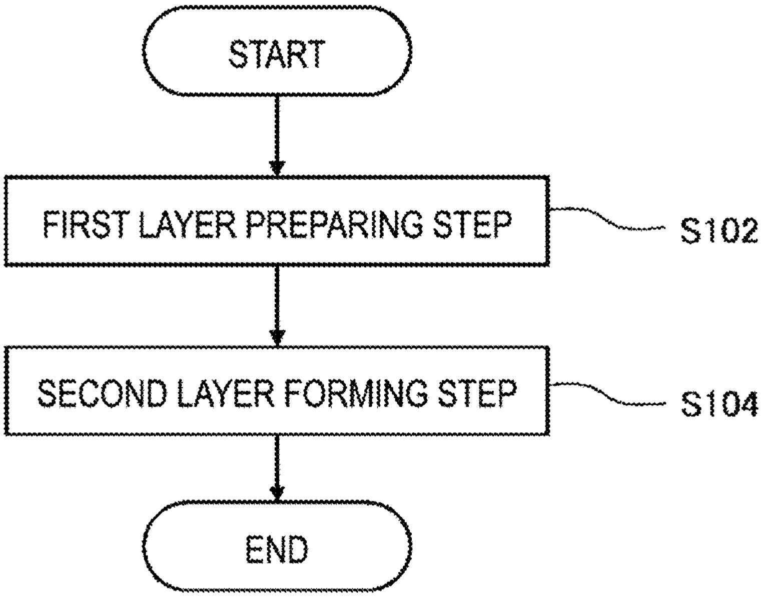
FIG. 7 is a flowchart explaining a method of producing a gas separation membrane according to an embodiment.
Figure 8:
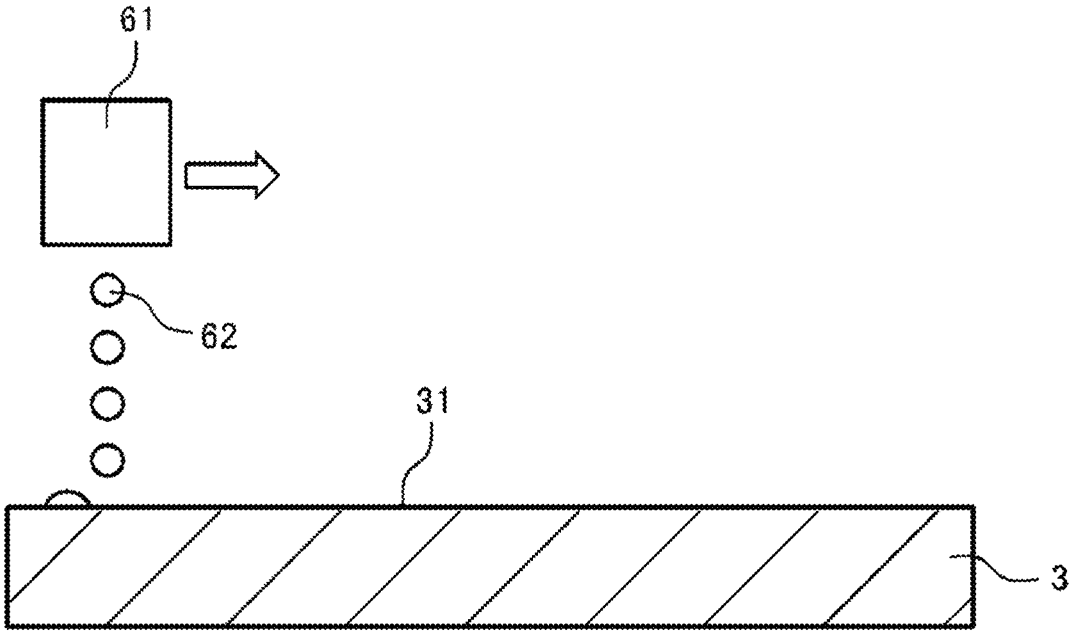
FIG. 8 is a cross-sectional view schematically explaining the method of producing a gas separation membrane illustrated in FIG. 7.

FIG. 7 is a flowchart explaining a method of producing a gas separation membrane according to an embodiment. FIG. 8 is a cross-sectional view schematically explaining the method of producing a gas separation membrane illustrated in FIG. 7. Note that in the following description, a method of producing the gas separation membrane 1 illustrated in FIG. 5 and FIG. 6 will be described as an example.

The method of producing the gas separation membrane 1 illustrated in FIG. 7 includes a first layer preparing step S102 and a second layer forming step S104. Each step will be described below in sequence.

3.1. First Layer Preparing Step

In the first layer preparing step S102, as illustrated in FIG. 8, the first layer 3 is prepared. The first layer 3 may be a stand-alone member or may be a member (coating) formed at a separate substrate or the like. In the latter case, for example, the separate substrate may be removed after the second layer forming step S104 described below.

Examples of the method of forming the first layer 3 include a method of applying a solution including a raw material and then the solidifying or curing the resulting coating film. Examples of the application method include various liquid phase film forming methods, such as a dipping method, a dropping method, an inkjet method, a dispenser method, a spraying method, a screen-printing method, a coater-coating method, and a spin-coating method, as well as gas phase film forming methods such as a plasma CVD method and a plasma polymerization method.

The method of forming the first layer 3 may also be a method of applying a precursor solution by the application method described above and then reacting the precursor at the resulting coating film. The precursor is a substance that, via reaction, becomes the constituent material of the first layer 3. An example of such a forming method is the sol-gel method.

The upper surface 31 of the resulting first layer 3 may be subjected to an activation treatment as necessary. The activation treatment is not limited as long as the treatment activates the upper surface 31. Examples of the activation treatment include a method of irradiating the upper surface 31 with energy rays, a method of heating the upper surface 31, a method of exposing the upper surface 31 to plasma or corona, and a method of exposing the upper surface 31 to ozone gas. Examples of the energy rays include infrared rays, ultraviolet rays, and visible light. The activation treatment facilitates the introduction of hydroxyl groups to the upper surface 31.

3.2. Second Layer Forming Step

In the second layer forming step S104, an ink including a raw material of the second layer 4 is discharged onto the upper surface 31 of the first layer 3 by an inkjet method. This forms the second layer 4 having an average thickness smaller than that of the first layer 3. As illustrated in FIG. 8, the inkjet method is a method in which an inkjet head 61 moves relative to the upper surface 31 while discharging an ink 62 to a target position where the ink 62 sets.

Specifically, first, the ink 62 including the raw material of the second layer 4 is prepared. Examples of the raw material for the second layer 4 include the above-described compound having gas separation ability or a precursor of the compound.

When substituting some of the organic groups contained in the compound with other functional groups, a treatment for removing the organic groups may be performed, and then a treatment that brings the compound into contact with a substance for introducing the functional groups may be performed as necessary. Examples of the treatment for removing the organic groups include the above-described activation treatment.

Examples of the ink 62 include a liquid including a water-in-oil (W/O) emulsion in which a water-based dispersoid is dispersed in an oil-based dispersion medium or a liquid including an oil-in-water (O/W) emulsion in which an oil-based dispersoid is dispersed in a water-based dispersion medium. Among them, the ink 62 is preferably a liquid including an O/W emulsion. When an O/W emulsion is used, the ink 62 prepared has a small environmental footprint and can be used with the existing inkjet head 61 that is compatible with water-based inks.

Further diluting the emulsion with the dispersion medium results in the main component of the ink 62. For example, in the case of an O/W emulsion, examples of the dispersion medium include those from which ionic impurities are removed as much as possible, with examples being pure water, such as ion-exchanged water, ultrafiltered water, reverse osmosis water, and distilled water, as well as ultrapure water.

When the raw material of the second layer 4 includes a structure derived from the coupling agent, a liquid including the coupling agent is used in the ink 62. The coupling agent is a compound having a functional group and a hydrolyzable group.

Examples of the functional group include a hydroxyl group, a carboxylic acid group, a carboxylate group, an acid anhydride group, an amino group, an amide group, an epoxy group, a mercapto group, and a phenyl group. In particular, these functional groups impart high affinity for acid gases to the second layer 4.

Examples of the hydrolyzable group include an alkoxy group, an acyloxy group, an aryloxy group, an aminoxy group, an amide group, a ketoxime group, an isocyanate group, a halogen atom, and a carboxylic acid group. Among these examples, the hydrolyzable group is preferably an alkoxy group or a carboxylic acid group.

Examples of the coupling agent include a silane coupling agent, a titanium coupling agent, an aluminum coupling agent, and a zirconium coupling agent, of which the coupling agent is particularly preferably a silane coupling agent.

The ink 62 may include an optional additive in addition to the dispersoid and the dispersion medium constituting the emulsion.

Examples of the additive include an organic solvent, a dispersant, an emulsifier, a surfactant, a stabilizer, a wetting agent, a thickener, a foaming agent, an anti-foaming agent, a coagulant, a gelling agent, an anti-settling agent, a charge control agent, an anti-static agent, an anti-aging agent, a softening agent, a plasticizer, a filler, a colorant, an odorant, an anti-adhesion agent, and a release agent.

Examples of the organic solvent include a cyclic amide, an alkyl polyol, a glycol ether, and other organic solvents.

Examples of the cyclic amide include lactams such as 2-pyrrolidone, 1-methyl-2-pyrrolidone (N-methyl-2-pyrrolidone), 1-ethyl-2-pyrrolidone (N-ethyl-2-pyrrolidone), N-vinyl-2-pyrrolidone, 1-propyl-2-pyrrolidone, 1-butyl-2-pyrrolidone, and 1-(2-hydroxyethyl)-2-pyrrolidone [N-(2-hydroxyethyl)-2-pyrrolidone]. These cyclic amides may be used alone or in a combination of two or more.

Examples of the surfactant include diethylene glycol, propylene glycol, polyethylene glycol, glycerin, triethylene glycol monobutyl ether, and diethylene glycol monobutyl ether; one of these examples can be used, or a mixture of two or more of these examples can be used. Among them, either glycerin or triethylene glycol monobutyl ether or both can be preferably used.

The content of the raw material in the ink 62 may be from 0.5 mass % to 25 mass % in terms of solid content concentration. When the content of the raw material is less than the lower limit value described above, film breakage may occur in the inkjet coating 401 formed depending on the composition of the ink 62. Meanwhile, when the content of the raw material exceeds the upper limit value described above, the dispersibility of the raw material may decrease and the film thickness difference within the inkjet coating 401 may increase depending on the composition of the ink 62.

The lower limit value of the content of water in the ink 62 is preferably 30 mass % or greater, more preferably 40 mass % or greater, and even more preferably 50 mass % or greater per the total amount of the ink 62. The upper limit value of the content of water is preferably 90 mass % or less, more preferably 85 mass % or less, and even more preferably 80 mass % or less per the total amount of the ink 62.

The static surface tension of the ink 62 at 20° C., although not limited, is preferably from 20 mN/m to 80 mN/m, more preferably from 25 mN/m to 45 mN/m. With this configuration, even if there is a pinhole or the like in the first layer 3 which is the base onto which the ink 62 is discharged, the ink 62 is prevented from permeating into the first layer 3 and easily forms a coating covering the pinhole or the like. As a result, the coverage rate of the second layer 4 can be increased in particular. Note that, the static surface tension is the surface tension when the liquid surface is stationary, and is the surface tension 30 seconds after the liquid surface is formed.

Note that, when the static surface tension is less than the lower limit value described above, the permeability of the ink 62 increases, and thus the coverage rate of the second layer 4 may decrease. Meanwhile, when the static surface tension exceeds the upper limit value described above, wetting and spreading of the ink 62 is difficult, and the coverage rate of the second layer 4 may decrease.

The surface tension of the ink 62 can be measured by, for example, a method of wetting a platinum plate with the ink 62 in an environment of 20° C., and, after 30 seconds, confirming the surface tension using an automatic surface tensiometer CBVP-Z available from Kyowa Interface Science Co., Ltd.

The viscosity of the ink 62 at 20° C., although not limited, is preferably from 2 mPa·s to 20 mPa·s, more preferably from 4 mPa·s to 15 mPa·s. This allows the ink 62 to be accurately supplied to a target position. In addition, even if there is a pinhole or the like in the first layer 3, the ink 62 is prevented from permeating into the first layer 3 and easily forms a coating. As a result, the coverage rate of the second layer 4 can be easily increased.

Note that, the viscosity of the ink 62 can be, for example, a value measured under an environment of 20° C. using a viscoelasticity tester MCR-300 available from Pysica.

The density of the ink 62, although not limited, is preferably from 1.00 g/cc to 1.20 g/cc, more preferably from 1.05 g/cc to 1.15 g/cc. This can make the dispersoid less likely to precipitate and can sufficiently ensure the concentration of the dispersoid. As a result, by using such an ink 62, the second layer 4 having a high coverage rate can be efficiently formed.

By discharging such an ink 62 onto the upper surface 31 while moving the inkjet head 61 relative to the upper surface 31, the raw material can be set at a target position and at a target amount with a high probability. As such, the inkjet coating 401 having a high coverage rate even when the film thickness is small can be formed.

In addition, the discharge speed of the ink 62 is preferably approximately from 2 m/s to 20 m/s. Furthermore, the discharge frequency of the ink 62 is preferably approximately from 3 kHz to 30 kHz. In addition, the volume of a droplet of the ink 62 (ink droplet) formed by discharging is set as appropriate in accordance with the size of the first fixed film 41 to be formed, but may be, for example, from 10 pL to 100 pL, more preferably from 30 pL to 70 pL. Furthermore, the thickness of the undried coating formed by the landed ink droplets is preferably from 0.05 μm to 3 μm, more preferably from 0.1 μm to 1 μm.

When the conditions described above are satisfied, the drying speed of the ink droplets discharged is optimized. As such, when parts of the first fixed films 41 formed adjacent to each other overlap each other, the overlapping parts are easily integrated. That is, there is an increased probability that after one of two first fixed films 41 to be formed adjacent to each other is formed and before the one fixed film 41 is dried, the other first fixed film 41 is formed in an overlapping manner. As such, integration easily occurs at the circumferential portions 43 of the first fixed films 41, making it possible to form the inkjet coating 401 with less gaps 44.

In this step, after a first operation of forming the inkjet coating 401 (first discharged film) located at the first layer is performed, a second operation of forming the inkjet coating 402 (second discharged film) located at the second layer may be performed. In this case, the arrangement pattern of the second fixed films 45 may be set based on the arrangement pattern of the first fixed films 41. In this way, the second fixed films 45 can be disposed so as to overlap the gaps 44 at a high probability. As such, the second layer 4 having a particularly high coverage rate can be formed efficiently (at a high speed) without increasing the film thickness more than necessary.

In addition, since the gap 44 is recessed as compared with its surrounding area, the ink droplet is likely to stay in the gap 44. Therefore, the volume of the ink droplet that forms the second fixed film 45 is preferably set to be smaller than the volume of the ink droplet that forms the first fixed film 41. Even when the volume of the ink droplet is small, the gap 44 can be filled with a high probability. As such, it is possible to ensure a sufficiently high coverage rate of the second layer 4 while suppressing the film thickness of the inkjet coating film 402 located at the second layer.

Note that the volume of a droplet of the ink 62 discharged in the second operation may be greater, but is preferably smaller, than the volume of a droplet of the ink 62 discharged in the first operation. In this way, the diameter of the second fixed film 45 can be made smaller than the diameter of the first fixed film 41. As a result, the second layer 4 having a high coverage rate can be produced without increasing the film thickness of the second layer 4 more than necessary.

The composition of the ink 62 discharged in the second operation may be the same as or different from the composition of the ink 62 discharged in the first operation. In the former case, the resulting second layer 4 has a uniform composition, achieving a homogeneous performance. Meanwhile, in the latter case, the resulting second layer 4 can achieve characteristics that are difficult to balance with a homogeneous composition.

4. Use of Gas Separation Membrane

The gas separation membrane 1 according to an embodiment can be used for gas separation and recovery, gas separation and purification, and the like. In particular, the gas separation membrane 1 may be used for the purpose of selectively allowing the passage of carbon dioxide from a mixed gas including carbon dioxide and other gas components. Thus, the gas separation membrane 1 can be applied to, for example, a technique for separating and recovering carbon dioxide contained in the atmosphere (direct air capture, or DAC) and a technique for separating and recovering carbon dioxide from a crude oil-associated gas or a natural gas including methane as the main component. The gas separation membrane 1 can be used not only for separation in gas phase but also for separation in liquid phase.

5. Effects Achieved by Embodiment Described Above

As described above, the gas separation membrane 1 according to the embodiment described above includes the first layer 3 and the second layer 4. The second layer 4 is provided at the upper surface 31 (the surface on one side) of the first layer 3 and includes a compound having gas separation ability. In the gas separation membrane 1, the average thickness of the second layer 4 is smaller than the average thickness of the first layer 3, and the second layer 4 is an inkjet coating.

The second layer 4, which is an inkjet coating, is an aggregate of the first fixed films 41 formed of ink droplets that have set. As such, film breakage is less likely to occur even when the film thickness is made sufficiently small. Therefore, the resulting second layer 4 has a high coverage rate with respect to the upper surface 31 even when having a sufficiently small average thickness. In addition, the first fixed film 41 has a film thickness distribution, which gives it a large specific surface area. As such, the chances of contact between the constituent material of the second layer 4 and the mixed gas can be increased, which in turn can increase the selective separation property. Therefore, according to the above configuration, the resulting gas separation membrane 1 achieves high gas permeability while ensures high selective separation property.

The compound having gas separation ability may include a structure derived from PET, POM, PLA, PDMS, cellulose, or a coupling agent. Such a compound facilitates the realization of the second layer 4 having affinity particularly for acidic gases and good selective separation property.

In addition, the compound having gas separation ability may include a PDMS derivative in which one of the hydrogen atoms of some methyl groups contained in PDMS is substituted with a hydroxyl group or an amino group. In this way, the resulting gas separation membrane 1 further has both the gas-selective separation property and gas permeability.

The coverage rate of the second layer 4 with respect to the first layer 3 is preferably 95.0% or greater. With this configuration, even if a pinhole is present in the first layer 3, the probability of the pinhole being filled by the second layer 4 is increased, and the ratio of passage of components other than the target gas component can be suppressed. As a result, the selective separation property (separation ratio of a specific gas component) of the second layer 4 can be sufficiently increased.

Also, the average thickness of the second layer 4 is preferably from 1 nm to 100 nm. This makes it possible to increase the gas permeability while ensuring the selective separation property of the second layer 4.

In addition, the first layer 3 preferably includes an organopolysiloxane. This results in the first layer 3 having good gas permeability particularly to carbon dioxide.

Further, the second layer 4 may have a multilayer structure. With this configuration, even when the inkjet coating 401 located at the first layer has the gaps 44, the gaps 44 can be filled with the inkjet coating 402 located at the second layer or above. As a result, the problem that the selective separation property of the gas separation membrane 1 decreases due to the gaps 44 can be solved or mitigated.

The method of producing a gas separation membrane according to an embodiment is a method of producing the gas separation membrane 1 including the first layer 3 and the second layer 4 that is provided at the upper surface 31 (the surface on one side) of the first layer 3 and that includes the compound having gas separation ability, and the method includes the second layer forming step S104. In the second layer forming step S104, the ink including the above-described compound is discharged onto the upper surface 31 of the first layer 3 by an inkjet method, forming the second layer 4 having an average thickness smaller than that of the first layer 3.

According to such a method for producing a gas separation membrane, the second layer 4 is formed by an inkjet method. As such, film breakage is less likely to occur even when the film thickness of the second layer 4 is made sufficiently small. Therefore, the second layer 4 having a high coverage rate with respect to the upper surface 31 even when having a sufficiently small average thickness can be efficiently formed. In addition, the second layer 4 having a film thickness distribution and a large specific surface area can be produced. As such, it is possible to produce the gas separation membrane 1 that achieves high gas permeability while ensuring high selective separation property.

The second layer forming step S104 includes the first operation and the second operation. In the first operation, droplets of the ink 62 are arranged on the upper surface 31 (the surface on one side) of the first layer 3 to form the inkjet coating 401 (first discharged film). In the second operation, droplets of the ink 62 are arranged on the inkjet coating 401 to form the inkjet coating 402 (second discharged film).

According to such a configuration, the inkjet coating 402 can be disposed so as to overlap the gaps 44 of the inkjet coating 401 at a high probability. Thus, the second layer 4 having a particularly high coverage rate can be formed efficiently (at a high speed) without increasing the film thickness more than necessary.

In addition, the volume of a droplet of the ink 62 discharged in the first operation may be from 10 pL to 100 pL. Further, a droplet of the ink 62 discharged in the second operation may be smaller than a droplet of the ink 62 discharged in the first operation. As such, the inkjet coating 401 formed has less gaps 44, and the second layer 4 having a high coverage rate can be produced without increasing the film thickness of the second layer 4 more than necessary.

The ink 62 may have a static surface tension at 20° C. of from 20 mN/m to 80 mN/m and a viscosity at 20° C. of from 2 mPa·s to 20 mPa·s. With this configuration, even if there is a pinhole or the like in the first layer 3 which is the base onto which the ink 62 is discharged, the ink 62 is prevented from permeating into the first layer 3 and easily forms a coating covering the pinhole or the like. As a result, the coverage rate of the second layer 4 can be increased in particular.

The ink 62 may include an O/W emulsion. In this way, the ink 62 prepared has a small environmental footprint and can be used with the existing inkjet head 61 that is compatible with water-based inks.

Although the gas separation membrane and the method of producing a gas separation membrane according to an aspect of the present disclosure have been described above based on a preferred embodiment, the present disclosure is not limited thereto.

For example, in the gas separation membrane according to an aspect of the present disclosure, each part of the embodiment described above may be replaced with a component having a similar function, and any component may be added to the embodiment described above. In addition, the method of producing a gas separation membrane according to an aspect of the present disclosure may be the embodiment described above plus an additional step having a purpose.

EXAMPLES

Next, specific examples of the present disclosure will be described.

6. Preparation of Gas Separation Membrane

6.1. Example 1

First, a PDMS sheet serving as a first layer was prepared. The PDMS sheet was a 30-μm-thick sheet composed of a polydimethylsiloxane. Next, the surface on one side of the PDMS sheet was subjected to an activation treatment which was a plasma treatment.

Next, an O/W emulsion including polylactic acid (PLA) was prepared. Next, the O/W emulsion, glycerin, triethylene glycol monobutyl ether, and 2-pyrrolidone were mixed to prepare an ink. The prepared ink had a static surface tension of 35 mN/m, a viscosity of 10 mPa·s, and a density of 1.1 g/cc.

Next, using an inkjet method, the prepared ink was used to form an inkjet coating located at the first layer. At this time, the discharge positions of the ink droplets were set in such a manner that first fixed films adjacent to each other were in contact with each other. The ink discharge speed was 5 m/s, the ink discharge frequency was 10 kHz, the ink droplet volume was 50 pL, and the thickness of the undried coating formed by the landed ink liquid was 0.1 μm.

Next, using an inkjet method, an inkjet coating located at the second layer was formed at the inkjet coating located at the first layer. At this time, the discharge positions of the ink droplets were set at positions corresponding to the gaps between the first fixed films. The ink discharge conditions were the same as the discharge conditions for the first layer except that the volume of the ink droplet was reduced. The average diameter of the second fixed films formed was 40% of the average diameter of the first fixed films. In this way, a gas separation membrane was produced.

6.2. Examples 2 to 16

Gas separation membranes were produced in the same manner as in Example 1 except that the production conditions were changed to those presented in Table 1 or table 2. Note that, in order to change the diameters of the first fixed film and the second fixed film, the volume of the ink droplet was adjusted. In addition, in Example 10, some of the hydrogen atoms of methyl groups contained in polydimethylsiloxane were substituted with hydroxyl groups (—OH). Further, in Example 11, some of the hydrogen atoms of methyl groups contained in polydimethylsiloxane were substituted with amino groups (—$NH_2$).

6.3. Comparative Example 1

A gas separation membrane was produced in the same manner as in Example 1 except that a spin-coating method was employed instead of the inkjet method and that the production conditions were changed to those presented in Table 1.

6.4. Comparative Example 2

A gas separation membrane was produced in the same manner as in Example 1 except that a bar-coating method was employed instead of the inkjet method and that the production conditions were changed to those presented in Table 1.

6.5. Comparative Example 3

A gas separation membrane was produced in the same manner as in Example 16 except that a spin-coating method was employed instead of the inkjet method and that the production conditions were changed to those presented in Table 2.

6.6. Comparative Example 4

A gas separation membrane was produced in the same manner as in Example 16 except that a bar-coating method was employed instead of the inkjet method and that the production conditions were changed to those presented in Table 2.

7. Evaluation of Gas Separation Membrane

The gas separation membranes of Examples and Comparative Examples were evaluated as follows.

7.1. Gas Permeability

The gas separation membranes of Examples and Comparative Examples were cut into circles having a diameter of 5 cm, resulting in test samples. Next, a mixed gas in which carbon dioxide and nitrogen were mixed at a volume ratio of 13:87 was supplied upstream of the test samples using a gas transmission rate measuring device. Note that, the total pressure upstream was adjusted to 5 MPa, the partial pressure of carbon dioxide was adjusted to 0.65 MPa, the flow rate was adjusted to 500 mL/min, and the temperature was adjusted to 40° C. Then, gas components passed through the test samples were analyzed by gas chromatography.

Next, based on the analytical results, the carbon dioxide gas permeation rates $R_{CO2}$ at the gas separation membranes were calculated. Then, the gas permeation rate $R_{CO2}$ calculated for a gas separation membrane in which the second layer was not formed (a gas separation membrane composed only of the first layer) was used as a reference. Based on this reference, the degree of decrease in the gas permeation rate $R_{CO2}$ calculated for the gas separation membrane of each Example and each Comparative Example was calculated as "$CO_2$ permeability decrease rate". The $CO_2$ permeability decrease rate is a ratio of a decrease with respect to the above-described reference. Then, relative evaluations of the gas permeabilities of the gas separation membranes were performed by comparing the calculated $CO_2$ permeability decrease rates with the following evaluation criteria. The evaluation results are presented in Table 1 and Table 2.

A: $CO_2$ permeability decrease rate is 20% or less

B: $CO_2$ permeability decrease rate is greater than 20% and 30% or less

C: $CO_2$ permeability decrease rate is greater than 30%

7.2. Selective Separation Property

Based on the analytical results above, the nitrogen gas permeation rates $R_{N2}$ at the gas separation membranes were calculated. Next, the ratios of the carbon dioxide gas permeation rates $R_{CO2}$ to the nitrogen gas permeation rates $R_{N2}$, or $R_{CO2}/R_{N2}$, were calculated. Then, relative evaluations of the selective separation properties of the gas separation membranes were performed by comparing the ratios $R_{CO2}/R_{N2}$ with the following evaluation criteria. The evaluation results are presented in Table 1 and Table 2.

A: The ratio $R_{CO2}/R_{N2}$ is greater than that in Comparative Example 1

B: The ratio $R_{CO2}/R_{N2}$ is equivalent to that in Comparative Example 1

C: The ratio $R_{CO2}/R_{N2}$ is less than that in Comparative Example 1

TABLE 1

| | | | | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|---|---|
| Composition of Gas Separation Membrane | First Layer | Constituent Material | — | PDMS | PDMS | PDMS | PDMS | PDMS | PDMS | PDMS | PDMS | PDMS | PDMS |
| | | Average Thickness | μm | 30 | 30 | 30 | 30 | 30 | 30 | 30 | 30 | 30 | 30 |
| | Second Layer | Constituent Material | — | PDMS | PDMS | PDMS | PDMS | PDMS | PDMS | PDMS | PDMS | PDMS | PDMS |
| | | Average Thickness | nm | 80 | 70 | 100 | 150 | 50 | 120 | 80 | 80 | 200 | 300 |
| | | Structure | — | 2-Layer | 1-Layer | 2-Layer | 2-Layer | 2-Layer | 2-Layer | 2-Layer | 2-Layer | 1-Layer | 2-Layer |
| | | Average Diameter of First Fixed Films | μm | 5 | 1 | 3 | 2 | 10 | 15 | 5 | 5 | — | — |
| | | Percentage of Average Diameter of Second Fixed Films | % | 40 | — | 20 | 100 | 70 | 10 | 40 | 40 | — | — |
| | | Coverage Rate | % | 99.5 | 95.0 | 99.9 | 98.0 | 99.8 | 97.0 | 98.0 | 97.0 | 99.0 | 94.0 |
| | Film Formation Conditions | Film Formation Method | — | Inkjet Method | | | | | | | | Spin-Coating Method | Bar-Coating Method |
| | | Static Surface Tension of Ink | mN/m | 35 | 35 | 35 | 35 | 35 | 35 | 20 | 60 | 35 | 35 |
| | | Viscosity of Ink | mPa · s | 10 | 10 | 10 | 10 | 10 | 10 | 8 | 15 | 10 | 10 |
| Evaluation Result of Gas Separation Membrane | Gas Permeability | | | A | A | A | B | A | B | A | A | C | C |
| | Selective Separation Property | | | A | B | A | A | A | B | B | B | — | C |

TABLE 2

| | | | | Example 9 | Example 10 | Example 11 | Example 12 | Example 13 | Example 14 | Example 15 | Example 16 | Comparative Example 3 | Comparative Example 4 |
|---|---|---|---|---|---|---|---|---|---|---|---|---|---|
| Composition of Gas Separation Membrane | First Layer | Constituent Material | — | PDMS | PDMS | PDMS | PDMS | PDMS | PDMS | PDMS | PDMS | PDMS | PDMS |
| | | Average Thickness | μm | 30 | 30 | 30 | 30 | 30 | 30 | 30 | 30 | 30 | 30 |
| | Second Layer | Constituent Material | — | PDMS | PDMS + OH | PDMS + NH2 | PDMS | PET | POM | PLA | Cellulose | Cellulose | Cellulose |
| | | Average Thickness | nm | 80 | 80 | 80 | 80 | 100 | 100 | 100 | 100 | 200 | 300 |
| | | Structure | — | 2-Layer | 2-Layer | 2-Layer | 2-Layer | 2-Layer | 2-Layer | 2-Layer | 2-Layer | 1-Layer | 2-Layer |
| | | Average Diameter of First Fixed Films | μm | 5 | 5 | 5 | 5 | 7 | 7 | 7 | 7 | — | — |
| | | Percentage of Average Diameter of Second Fixed Films | % | 40 | 40 | 40 | 40 | 50 | 50 | 50 | 50 | — | — |
| | | Coverage Rate | % | 99.5 | 99.5 | 99.5 | 98.0 | 99.5 | 99.5 | 99.5 | 99.5 | 99.0 | 95.0 |
| | Film Formation Conditions | Film Formation Method | — | Inkjet Method | | | | | | | | Spin-Coating Method | Bar-Coating Method |
| | | Static Surface Tension of Ink | mN/m | 20 | 20 | 20 | 70 | 40 | 35 | 50 | 60 | 60 | 60 |
| | | Viscosity of Ink | mPa · s | 3 | 3 | 3 | 20 | 12 | 10 | 12 | 15 | 15 | 15 |

TABLE 2-continued

| | | Example 9 | Example 10 | Example 11 | Example 12 | Example 13 | Example 14 | Example 15 | Example 16 | Comparative Example 3 | Comparative Example 4 |
|---|---|---|---|---|---|---|---|---|---|---|---|
| Evaluation result of gas separation membrane | Gas permeability | B | B | B | A | A | A | A | A | C | C |
| | Selective separation properties | B | A | A | B | A | A | A | A | C | C |

As is clear from Table 1 and Table 2, the gas separation membrane of each of Examples had a small decrease in gas permeability as compared with the reference (small $CO_2$ permeability decrease rate), and had high selective separation property as compared with Comparative Example 1. That is, it was found that a gas separation membrane having high selective separability of a target gas and good gas permeability can be realized according to the present disclosure.

In comparison, in the gas separation membrane of each of Comparative Examples, the film thickness of the second layer could not be made sufficiently small. As such, the decrease in gas permeability compared to the reference was large, and the selective separation property was not sufficient. This proved that the second layer having a small thickness but a high coverage rate can be formed by using an inkjet method.

What is claimed is:

1. A gas separation membrane comprising:
a first layer, and
a second layer that is provided at a surface on one side of the first layer and that includes a compound having gas separation ability, wherein
an average thickness of the second layer is smaller than an average thickness of the first layer,
the second layer is an inkjet coating,
the inkjet coating is composed of a plurality of fixed films of ink droplets arranged on the surface of the first layer,
each fixed film of the plurality of fixed films has a central portion and a circumferential portion, and
a film thickness of the central portion is different from a film thickness of the circumferential portion.

2. The gas separation membrane according to claim 1, wherein the compound includes a structure derived from PET, POM, PLA, PDMS, cellulose, or a coupling agent.

3. The gas separation membrane according to claim 1, wherein the compound includes a PDMS derivative in which one of hydrogen atoms of some methyl groups contained in PDMS is substituted with a hydroxyl group or an amino group.

4. The gas separation membrane according to claim 1, wherein a coverage rate of the second layer with respect to the first layer is 95.0% or greater.

5. The gas separation membrane according to claim 1, wherein the average thickness of the second layer is from 1 nm to 100 nm.

6. The gas separation membrane according to claim 1, wherein the first layer includes an organopolysiloxane.

7. The gas separation membrane according to claim 1, wherein the second layer has a multilayer structure.

* * * * *